United States Patent
Merayo et al.

(10) Patent No.: US 9,260,327 B2
(45) Date of Patent: Feb. 16, 2016

(54) SYSTEM FOR PURIFYING POLLUTED WATER AND PURIFICATION METHOD

(75) Inventors: Pedro Garcia Merayo, Ponferrada (ES); Fernando Oscar Lamelas Pombriego, Ponferrada (ES); Gonzalo Gutierrez De La Roza Perez, Ponferrada (ES)

(73) Assignee: Bioner Bierzo, S.L., Ponferrada (Leon) (ES)

( * ) Notice: Subject to any disclaimer, the term of this patent is extended or adjusted under 35 U.S.C. 154(b) by 178 days.

(21) Appl. No.: 13/884,724

(22) PCT Filed: Jun. 8, 2012

(86) PCT No.: PCT/ES2012/070430
§ 371 (c)(1),
(2), (4) Date: Aug. 2, 2013

(87) PCT Pub. No.: WO2012/168531
PCT Pub. Date: Dec. 13, 2012

(65) Prior Publication Data
US 2015/0151989 A1    Jun. 4, 2015

(30) Foreign Application Priority Data

Jun. 10, 2011 (ES) .................................. 201130973
Jan. 13, 2012 (ES) .................................. 201230041

(51) Int. Cl.
*C02F 1/52* (2006.01)
*C02F 1/44* (2006.01)
(Continued)

(52) U.S. Cl.
CPC ............... *C02F 1/52* (2013.01); *B01D 21/003* (2013.01); *B01D 21/0012* (2013.01); *B01D 21/0018* (2013.01); *B01D 21/2488* (2013.01);
(Continued)

(58) Field of Classification Search
None
See application file for complete search history.

(56) References Cited

U.S. PATENT DOCUMENTS 5,297,895 A * 3/1994 Johnson .................. E02B 11/00
                                                     405/37
6,000,880 A * 12/1999 Halus ........................ E02B 9/00
                                                     405/36

(Continued)

FOREIGN PATENT DOCUMENTS

| DE | 20306503 U1 | 8/2003 |
| DE | 102004006084 A1 | 9/2005 |
| WO | WO2009004123 A1 | 1/2009 |

OTHER PUBLICATIONS

Tianhuangping Pumped-Storage Hydro Plant—Power Technology—Wikipedia—cited in 2011; printed Apr. 3, 2015 from the internet.*

(Continued)

*Primary Examiner* — Krishnan S Menon
(74) *Attorney, Agent, or Firm* — Hayes Soloway PC

(57) ABSTRACT

It comprises at least one first lower main deposit (1) arranged at a lower level and at least one second upper main deposit (2) arranged at an upper level, both containing polluted water to be purified, while at the same time the bottom of the large area main deposits (1-2) are communicated with each other through at least one intermediate pipe (3) through which the polluted water is circulated in both directions successively and alternatively under turbulent regime. From the bottom of the main deposits (1-2) the pollutants will be removed or purged to a cavity (9) that receives part of the water together with a high concentration of pollutants decanted and precipitated at the bottom of said main deposits (1-2), said pollutants being treated and separated in that cavity (9).

23 Claims, 10 Drawing Sheets

(51) Int. Cl.
*F03B 13/00* (2006.01)
*C02F 3/24* (2006.01)
*B01D 21/00* (2006.01)
*B01D 21/24* (2006.01)
*C02F 1/66* (2006.01)
*C02F 1/72* (2006.01)
*F03B 13/08* (2006.01)
*H02K 7/18* (2006.01)
*C02F 103/10* (2006.01)
*E02B 9/06* (2006.01)
*C02F 1/00* (2006.01)

(52) U.S. Cl.
CPC .. *C02F 1/66* (2013.01); *C02F 1/72* (2013.01); *C02F 3/24* (2013.01); *F03B 13/00* (2013.01); *F03B 13/08* (2013.01); *H02K 7/1823* (2013.01); *C02F 2001/007* (2013.01); *C02F 2103/10* (2013.01); *C02F 2201/002* (2013.01); *C02F 2301/024* (2013.01); *C02F 2301/046* (2013.01); *C02F 2303/10* (2013.01); *E02B 9/06* (2013.01); *Y02W 10/15* (2015.05); *Y02W 10/30* (2015.05)

(56) References Cited

U.S. PATENT DOCUMENTS

| | | | | |
|---|---|---|---|---|
| 6,068,773 A * | 5/2000 | Sheaffer | ............... | C02F 3/301 210/149 |
| 6,318,292 B1 * | 11/2001 | Sakai | ............... | A01K 63/04 119/226 |
| 2003/0082004 A1 * | 5/2003 | Wilkerson | ............... | E02B 11/00 405/43 |
| 2008/0023963 A1 * | 1/2008 | Perich | ............... | C02F 1/04 290/52 |
| 2008/0253837 A1 * | 10/2008 | Miller | ............... | E02B 9/02 405/80 |

OTHER PUBLICATIONS

A simulation model for evaluating Tianhuangping pumped storage hydro-plant, Renewable Energy, vol. 11, No. 2, 1997.*
Tianhuangping pumped storage power station (date unknown).*

* cited by examiner

SYSTEM FOR PURIFYING POLLUTED WATER AND PURIFICATION METHOD

OBJECT OF THE INVENTION

The present invention, such and as expressed in the statement of this specification, relates to a system for purifying polluted water, urban or industrial, in particular, directed to mine drainage water, as well as the purification method of that polluted water.

The system and method of the invention are applicable to all kinds of polluted water of both urban and industrial origin or from rain run-off, whether of acidic or basic nature, both with the presence of suspended solids and in colloidal or dissolved state, with the presence of heavy metals, dangerous substances and dissolved salts. This purification system is of special application for mine drainage wastewater, such that an objective of the invention is to achieve during the purification method the decantation of pollutants in suspension, also favoring the precipitation of pollutants through the oxygenation of the water, as well as the elimination or reduction of volatile compounds in the polluted water.

The system and method are therefore applicable to all kinds of polluted water of both urban and industrial origin or from rain run-off, whether of acidic or basic nature, both with the presence of suspended solids and in colloidal or dissolved state, with the presence of heavy metals, dangerous substances and dissolved salts.

This purification system is of special application for the mine drainage wastewater as referred above, such that during the purification method the object is to achieve the decantation of contaminants in suspension, also favoring the precipitation of pollutants through the oxygenation of the water, as well as the elimination or reduction of volatile compounds in the polluted water.

To achieve the essential objective of the invention, a device is used to divert or transfer the polluted water successively and alternatively among main deposits with suitable capacity, located at different height.

The system and method of the invention generate the following effects favorable to the environment:

High hydraulic retention time of the polluted water in the system.
High oxygenation and high agitation (turbulent regime) of water that facilitates the separation of the pollutants to be able to treat them properly.
Effective and rapid precipitation and decanting of the pollutants.
Effective and rapid isolation of the pollutants.
Generation of manageable and good quality energy.

BACKGROUND OF THE INVENTION

In the present day, the purification of polluted water is a topic that has been sufficiently developed. There are currently many systems on the basis of the characteristics of the polluted raw water that is intended to be purified.

In short, the purification of polluted water consists of a series of chain unit processes (physical, chemical and biological) that reproduce in an enclosure the natural self-purification and they are intended to successively separate the pollutants from the polluted water containing them.

The separation technique of particles in suspension is based mainly on the physical phenomenon of decantation, with different variants and configurations. However, the separation of dissolved and colloidal pollutants is more problematic, requiring physical-chemical treatments and others more advanced.

In the case of polluted water of urban origin, different types of treatment plants are designed depending on the flow rate of water to be treated, the characteristics of the polluted water and the area of available land. Thus, we can find from the simpler, such as septic tanks, to the more complex, such as the so-called waste water treatment stations (WWTS).

In the case of polluted water of industrial origin, the different purification systems are highly conditioned primarily by three factors, such as the flow rate to be treated, the nature of water (acidic or basic), the polluting substances that it has and the concentration of said pollutants.

DESCRIPTION OF THE INVENTION

The system for purifying polluted water, comprises in principle at least one first lower main deposit arranged at a lower level and at least one second upper main deposit arranged at an upper level, both containing polluted water to be purified, while at the same time the bottom of the aforementioned main deposits are communicated with each other through at least one intermediate pipe through which the polluted water is circulated through such intermediate pipe in both directions successively and alternatively under turbulent regime.

In said main deposits well-known systems of sludge extraction or purge are installed, which through pipes or ducts flow into a cavity (perimeter channel) that receives part of the water together with a high concentration of pollutants precipitated and decanted at the bottom of such main deposits, said pollutants being suitably treated in that cavity.

The polluted water, once captured, can be directed either to any of the deposits, lower or upper, even to both of them if there are several sources of polluted water located at different heights.

Through high hydraulic retention times, combined with the oxygenation achieved in the polluted water when it is transferred between the deposits located at different height, concentrations of dissolved oxygen able to oxidize the metal to suitable oxidation states are achieved, so that the precipitation of the same in the form of oxides or hydroxides is produced.

On the other hand, the agitation promotes the transport of the colloidal particles to cause collisions among them favoring their agglomeration, since the particles must collide to agglomerate, and the mixing promotes the collision. While at the same time the oxygenation oxidizes the organic matter and breaks bonds in the natural colloids, helping to a better subsequent flocculation.

Also, this process of agitation and oxygenation will improve the elimination of certain volatile pollutants that may be present in the polluted water.

As transferring devices between the deposits located at different height, there are used for example, a set of pumps and turbines capable of pumping the polluted water from the lower to the upper deposits and activating the turbines, likewise said polluted water from the upper to the lower deposits, achieving through these transferring the oxygenation of the water.

According to the polluting substances present in the water and its concentration, the variables that determine the sizing of the purification system are the retention time, the frequency of transferring of the polluted water between deposits and the amount of oxygen needed to be provided to the system.

Likewise, according to the pollutants present in the water and its concentration, there can be previous or supplementary purification treatments, before the entrance of the water to the main deposits or after the exit of the water from said main deposits.

According to the purification needs, the system can only use the flow rate of polluted water to replenish the losses by evaporation, or capture, at all times, the totality of the polluted water, and it may, in the latter case, exist a surplus flow rate of water, which will be returned to the water bodies, already purified.

The polluting substances decanted and precipitated at the bottom of the deposits in the form of sludge, can be removed by traditional methods and directed to other treatment facilities or sludge tank complying with the implementing legislation, or else, be collected in a special cavity attached to the deposits from which depart perimeter pipelines arranged around the nozzle of each of the main deposits, divided into two equal circuits that can operate simultaneously or independently, allowing its cleaning without stopping the purification, while at the same time said special cavity has a design suitable to achieve through the addition or not of suitable reagents, the continuation of the precipitation of pollutants and the concentration of the precipitated and decanted pollutants through the overflow and filtering of the purges and sludge extracted from the main deposits.

The water treated in these perimeter cavities can be partially or totally recirculated to the respective main deposits through recirculation pipes and suitable valves, while at the same time the water treated in these perimeter cavities can be partially or totally drained to an additional purification system through a drainage pipe, if this additional purification was necessary, draining the water treated in the station of additional purification in a flow of water through a terminal pipe.

As an alternative the system of the invention comprises an initial deposit that receives the polluted water previously before pouring it in one of the main deposits, initial deposit where the polluted water receives known treatments to suit the pH, eliminate possible solids in suspension and other actions with the purpose of enabling the precipitation of pollutants in subsequent phases and protecting the ducts and mechanical elements of the facilities. It will also carry out regulation and lamination functions of flow rate tips.

The water contained in the aforementioned initial deposit is discharged in the respective main deposit through an initial pipe. At the same time, the pollutants precipitated and decanted in this initial deposit will be removed or purged to the perimeter cavity bordering the respective main deposit.

Another feature of the invention is that in a first actuation the water passes from the lower main deposit to the upper main deposit through a main pump, while in a second actuation the water circulates by gravity from the upper main deposit to a lower main deposit, passing through one or more turbines, generating energy.

In an embodiment the pumps and the turbines are integrated in a reversible hydroelectric plant sandwiched in the intermediate pipe which connects both main deposits, upper and lower.

Another feature of the invention is that the purge or extraction of sludge from the main deposits is effective because it can be carried out when the deposits are empty and it only remains a small amount of water at the bottom of the deposit and the decanted and precipitates that are not transferrable by height between the main deposits. However, the extraction and/or purge of sludge may also be carried out continuously without the need of the deposits being empty.

The purification method is characterized in that the polluted water to be purified is transferred successively and alternately in both directions between at least one lower main deposit arranged at a lower level and at least one upper main deposit arranged at an upper level, upstream through pumping and downstream by gravity, the flow rate of water passing through one or more turbines, the rotation of which provides energy, being accumulated at the bottom of the main deposits by precipitation and decanting a mass of water with pollutants which is diverted to a cavity (perimeter channel) where they are treated in a known manner.

From this cavity the partially purified water can be recirculated to the main deposits, or diverted outside the circuit. As an alternative and wherever necessary, the water is diverted from the aforementioned cavity to a station of additional purification and from here to a water stream.

Also, in the case that it is necessary an additional purification of the already decanted and precipitated water, said water can be extracted from the deposits and be provided with an additional purification treatment, before being discharged into the bodies of water in a direct or indirect way through the subsoil, into the perimeter channels through existing additional purification treatments, either filtration, chlorination, ozonation, UV rays, advanced lagooning or biological treatments such as nitrification-denitrification, biological removal of phosphorus or sulphates and/or chlorides.

According to the difference in height between the main deposits, the already decanted and precipitated water is likely to be subjected to supplementary process of microfiltration, ultrafiltration, nanofiltration, reverse osmosis or capacitive deionization, both using any of them as supplementary treatments at the exit of the purification circuit, or placing the filters or necessary membranes at the appropriate height and using as the column pressure the water present between the upper and lower deposits. For the latter, said water will be circulated, through the pipes that interconnect said main deposits and providing it with a branch at its bottom where there will be housed the filtration or reverse osmosis device needed, or else through a pipe independent of the main pipe. With regard to the capacitive deionization device, given that for its operation it does not need pressure, such device shall be placed generally at the exit of the circuit.

The polluted water disposed into the main deposits previously passes through an initial deposit where the acidity of the water is treated and are also eliminated the solids in suspension.

Finally it should be noted that the transferring between the main deposits is carried out through at least one intermediate pipe that connects the areas of greater depth of the bottom of the main deposits.

Another feature of the invention is that the main deposits are placed outside the course of the river and other water streams, as well as outside lakes or other natural depressions where there is a body of water in movement or statically, looking for sites with the most appropriate or convenient surfaces. In those cases where the area available for installing the purifier deposits of polluted water is less than the necessary surface to completely purify the available volume of water, the described system can be complemented with other deposits connected to the previous ones through new hydraulic ducts. With this solution it is formed a chain of decanting of polluted water between deposits, obtaining greater capacity of purification by increasing the surface of polluted water in contact with the atmosphere, and its oxygenation, improving the precipitation and decanting of pollutants. According to the location of the land available for the installation of these new deposits, and the height of said land, open or closed hydraulic circuits may be established.

Therefore, the system of the invention consists of purifying polluted water through its introduction in a circuit of a reversible hydroelectric plant, which consists of at least two main deposits artificially manufactured, joined together through the intermediate pipe, specially designed according to the quantity and quality of the water to be treated, to promote the processes of purification, as well as for the elimination of the pollutants precipitated and decanted during the process.

During the process, part of the water evaporates, decreasing the volume. The agitation of the water, which occurs when it is pumped and turbined between the main deposits, produces its oxygenation, favoring the processes of precipitation of dissolved and colloidal pollutants that are concentrated until reaching such a degree that they precipitate to the bottom of the deposits. Likewise, the agitation process favors the elimination or reduction of the volatile pollutants present in the water.

The precipitated and decanted pollutants are extracted periodically through known systems from the bottom of the deposits to perimeter cavities where they are suitably treated. Likewise, the solids precipitated and decanted in these cavities are removed periodically and managed in the most convenient way for the environment, and they can even be recovered.

The water evaporated in the deposits and cavities during the process, and the possible drained water is replenished letting more polluted water into the circuit, repeating the process described above, emphasizing that the system of the invention includes two artificial deposits or more connected to each other.

The implementation of the system and method of the invention are applicable to all kinds of polluted water, previously used water and waste water or discharges.

According to the physico-chemical characteristics of the polluted water, this process is used exclusively, or it is complemented with other existing purification processes, both prior and subsequent to the system of the invention. These supplementary processes are one of the following: homogenization, correction of pH, coagulation/flocculation, neutralization, lagooning treatments, wetlands or any other of the currently existing.

There is a unique implementation, as it is the case of excess waters or mine drainage waters, which usually come out contaminated with solids and other pollutant compounds. In the purification of polluted water from mine drainage, both underground and open-cast, a reversible plant is used as a central part of the purification process, facilitating and improving the processes of elimination of pollutants through sustainable processes of oxygenation and agitation that favor the precipitation and decanting of some of the main pollutants of this type of drainage.

The purification process using a reversible hydroelectric plant is suitable for all kinds of polluted water, because it allows reducing large part of the water to be treated by evaporation, as well as favoring the precipitation of large part of metals and toxic compounds, and it may be completed with other processes that favor the elimination of the rest of pollutants present in the water.

The system for purifying polluted water is also characterized in that:
The water contained in the main deposits, once a greater part of the pollutants have precipitated, is directed to a second perimeter channel annex to the first perimeter channel, being subjected in such second perimeter channel to additional conventional purification processes, such as treatments of lagooning, nitrification-denitrification, sulfate reduction by bacteria, or biological removal of phosphorus.

It comprises filtering means of polluted water, through which at least a part of the flow rate of polluted water is filtered during its transferring between the two main deposits, upper and lower, obtaining, therefore at the output of such filtering means a flow rate of purified water.

It comprises at least one bypass channel that extends from the intermediate pipe and the free end of which is a not submerged water exit mouth that discharges all or a part of the water flow rate in at least one of the main deposits.

The filtering media of the polluted water comprise filtration device that connects with the intermediate pipe through a bypass that integrates an opening and closing valve to lock or release fluid passage.

The filtering media of polluted water comprise in another embodiment, a filtration device that connects to an additional pipe independent of the intermediate pipe for interconnection between the two main deposits. Said additional pipe is communicated by one of its ends with at least the upper deposit.

In another embodiment, the filtering media of polluted water comprise a device of reverse osmosis that connects with the intermediate pipe by at least one bypass pipe that also integrates a bypass and stop valve to allow the blocking or unblocking of the passage of the fluid.

The filtering media of the polluted water comprise in another embodiment a device of reverse osmosis that connects to an additional pipe independent of the intermediate pipe, communicating said additional pipe by its ends with the two main deposits, upper and lower.

The bypass pipe comprises an upper bypass connected to the intermediate pipe in proximity to the upper deposit, while at the same time such upper bypass pours the water by its not submerged exit in the upper deposit obtaining thereby a better oxygenation and agitation of the water.

In another embodiment, the bypass pipe comprises a lower bypass connected to the intermediate pipe in proximity to the lower deposit, such lower bypass integrating an impulse turbine, with no submerged exit through which the water is poured in the lower deposit, thus also achieving improving the oxygenation and agitation of said water. The interconnection between the lower bypass and the intermediate pipe integrates an opening and closing valve.

In a first option, the system forms part of an Urban Waste Water Purification Station (WWPS) and the primary and secondary treatments typical of this type of facility are developed in it. In this first option the output of the pretreatment process (roughing, de-sanding and de-greasing) of the WWPS is connected to the initial deposit of the system and the effluents leaving the system undergo tertiary treatment if necessary.

In a second option, the system forms part of an Urban Waste Water Purification Station (WWPS) where the water enters the system after having carried out the primary and secondary conventional treatments, typical of this type of facilities. In this second option, the output of the secondary treatment process of the WWPS is connected to the initial deposit of the system to complete the purification process.

The method is also characterized in that:
Before the entry of the raw waste water in any of the main deposits 1-2, it receives a previous conventional purification treatment to reduce the solids in suspension and to act on the pH of said water, increasing or decreasing it.
The water drawn from any of the main deposits is subjected to an additional conventional purification process.

The water of at least one of the main deposits is subjected to a process of filtration.

All or part of the water flow rate pumped from the lower deposit to the upper deposit is allowed to fall freely into the latter.

At least a part of the water flow rate that is transferred from the upper deposit to the lower deposit is passed through the impulse turbine with no submerged exit.

The additional conventional purification process cited comprises purification techniques selected from chlorination, ozonation, UVA rays, lime addition, nitrification/denitrification and a biological process that includes the elimination or reduction of phosphorus and sulphates. These processes may be carried out using the perimeter channels or in supplementary facilities.

The conventional purification process uses media selected from the perimeter channels and supplementary facilities.

The method is also characterized in that all or part of the polluted water is subjected to a process of filtration selected from microfiltration, ultrafiltration, nanofiltration and reverse osmosis, arranging the filtering element at the necessary height and connected with an element selected from:

The bypass pipe that extends from the intermediate pipe.

The additional pipe independent of the intermediate pipe of interconnection of the two main deposits.

Next, to facilitate a better understanding of this specification and forming an integral part of the same some figures are attached wherein with illustrative character and without limitation the object of the invention has been represented.

DESCRIPTION OF AN EXAMPLE OF EMBODIMENT OF THE INVENTION

Figure 1:
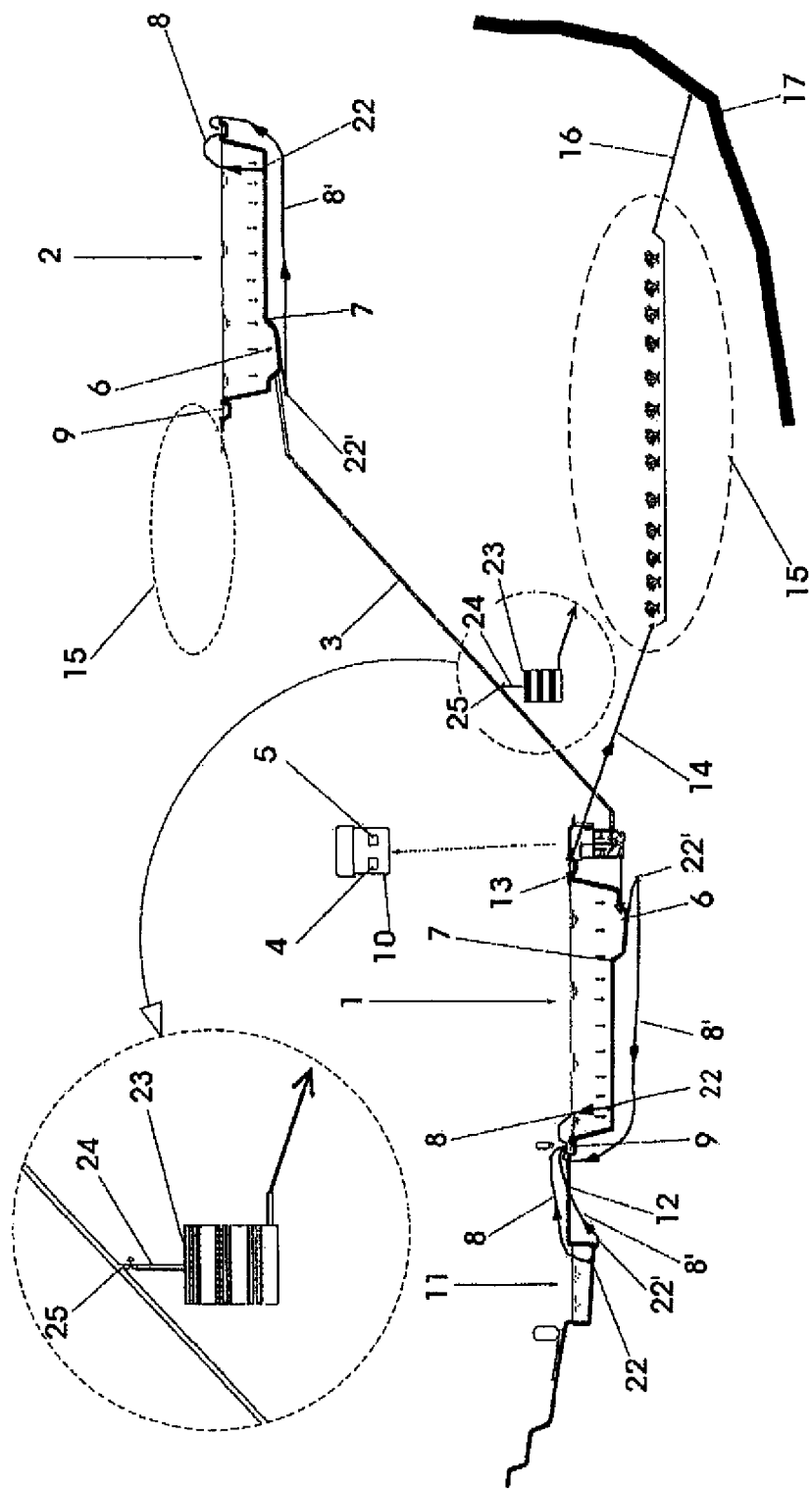
FIG. 1.—It shows an elevational view of the system for purifying polluted water and purification method, object of the invention. In an embodiment, the system has a filtration device placed at the necessary height in a bypass of the intermediate pipe of interconnection between the two main deposits: upper and lower.
Figure 2:
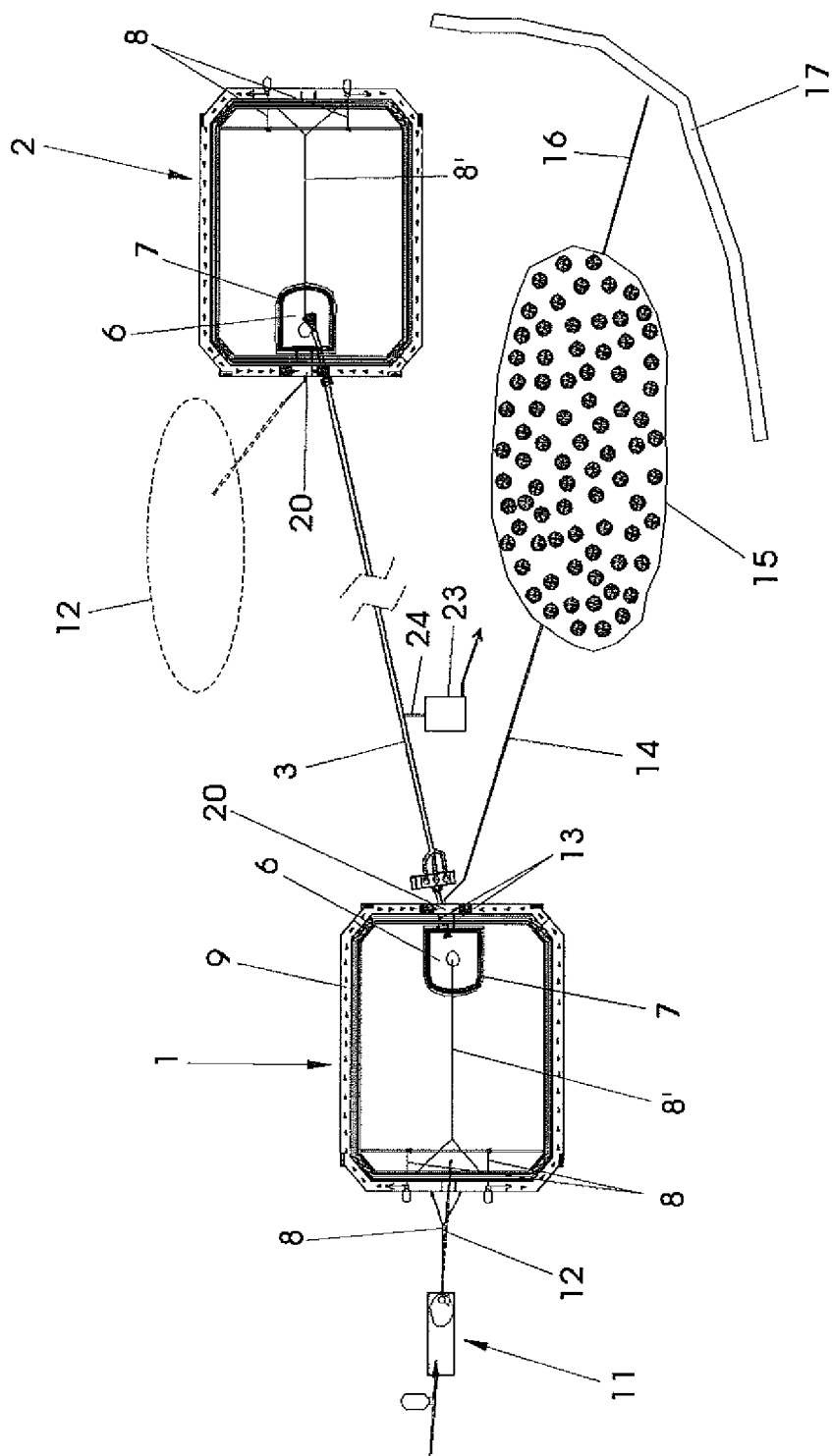
FIG. 2.—It shows a plant view of what is represented in the previous figure.
Figure 3:
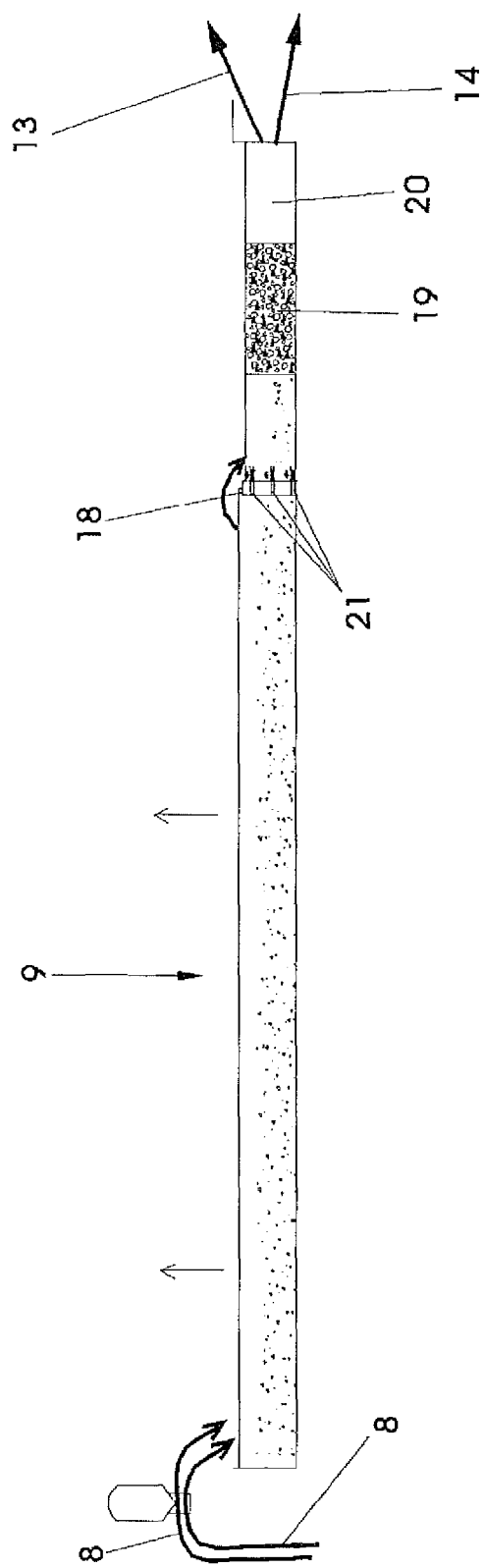
FIG. 3.—It shows the detail of a first cavity or perimeter channeling arranged in the nozzle of the main deposits.
Figure 4:
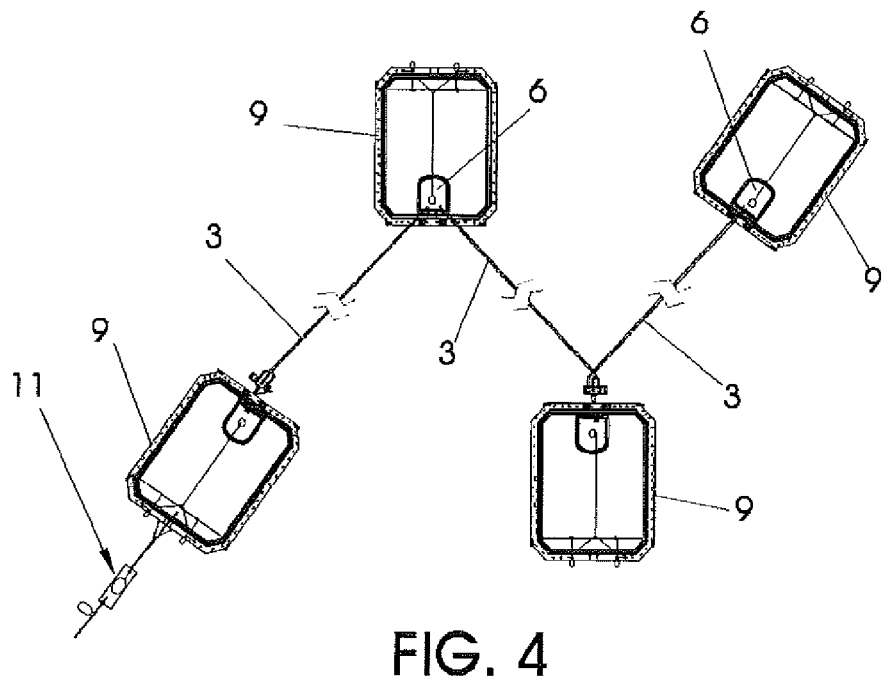
FIG. 4.—It shows a schematic view of an arrangement of a circuit consisting of more than two main deposits in open circuit.
Figure 5:
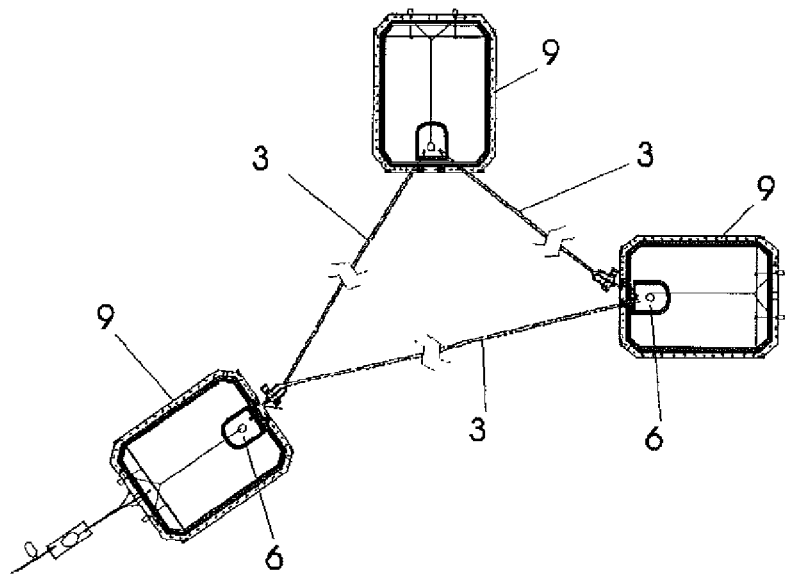
FIG. 5.—It shows a schematic view of an arrangement of a circuit consisting of more than two main deposits and a closed circuit.
Figure 6:
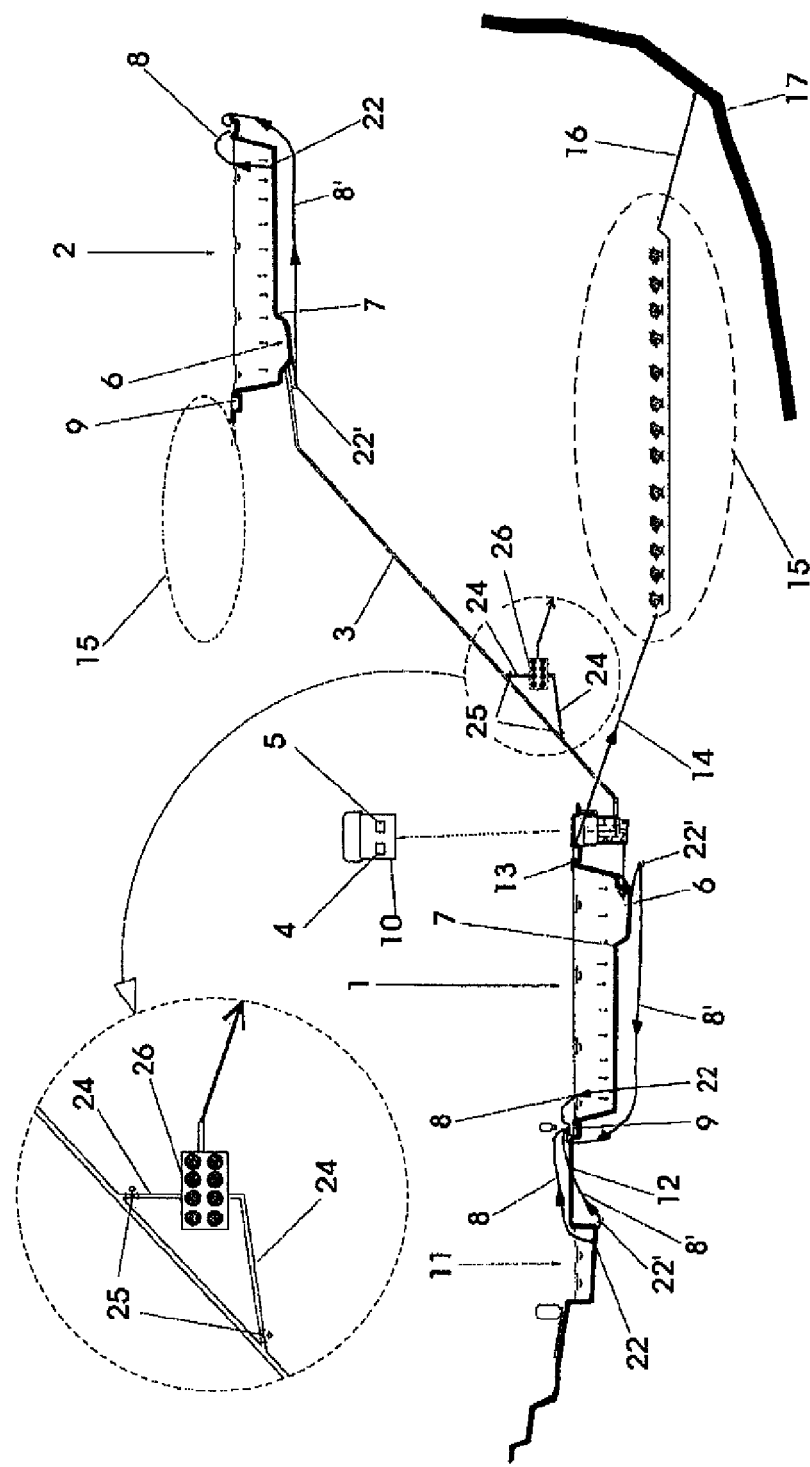
FIG. 6.—It shows a view similar to that shown in FIG. 1, showing in this FIG. 6 another embodiment of the invention consisting of a reverse osmosis device placed at the necessary height in a bypass of the intermediate pipe of interconnection between the two main deposits.
Figure 7:
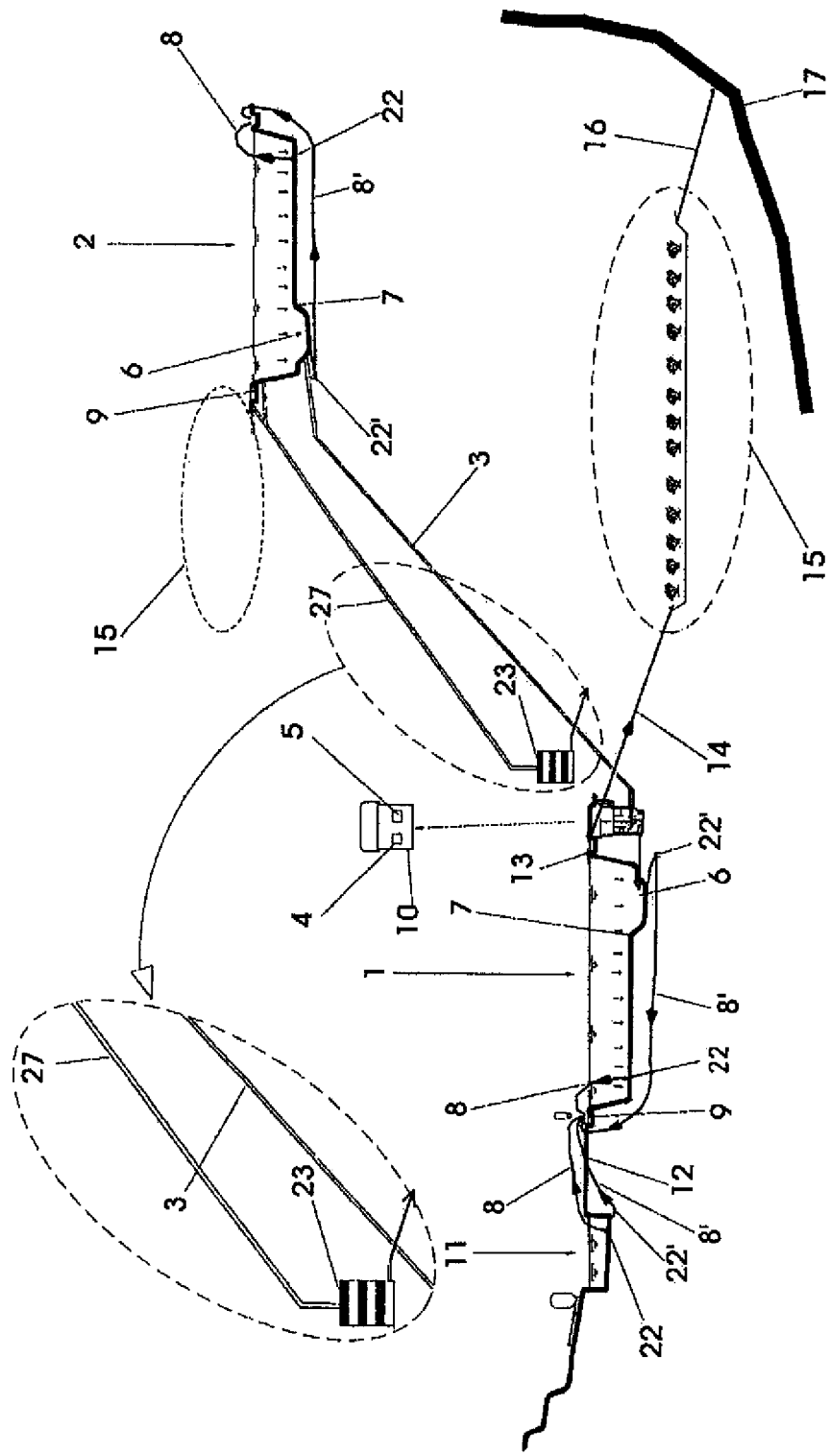
FIG. 7.—It essentially shows the filtration device referred to in FIG. 1. The same is placed at the necessary height in an additional pipe independent of the intermediate pipe of interconnection between the two main deposits.

The system for purifying polluted water envisages the following nomenclature used in the description:

1.—Lower main deposit
2.—Upper main deposit
3.—Intermediate pipe
4.—Main pump
5.—Turbine
6.—Suction vessel
7.—Sludge retention curb
8.—Sludge suction devices
8'.—Sludge purge devices
9.—First cavity or perimeter channeling
10.—Reversible hydroelectric plant
11.—Initial deposit
12.—Initial pipe
13.—Recirculation pipes
14.—Drain pipe
15.—Additional wastewater treatment station
16.—Terminal pipe
17.—Water stream
18.—Overflow dam
19.—Terminal filter
20.—Common cabin
21.—Emptying valves
22.—Sludge suction pumps
22'. Sludge purge pumps
23.—Pressure filtration device
24.—Bypass
25.—Opening and closing valve
26.—Reverse osmosis device
27.—Additional pipe
28.—Second cavity or perimeter channeling
29.—Upper bypass
30.—Opening and closing valve
31.—Impulse turbine
32.—Lower bypass
33.—Opening and closing valve.

It comprises at least one first lower main deposit 1 arranged at a lower level and at least one second upper main deposit 2 arranged at an upper level, both containing polluted water to be purified that has been previously diverted to one of the main deposits, while at the same time the bottom of both main deposits 1-2 are communicated with each other through at least one intermediate pipe 3 through which the polluted water is successively and alternatively circulated through the same in both directions, thereby obtaining a high oxygenation and a high agitation of the water under turbulent regime, while at the same time the main deposits 1-2 are out of the reach of a natural water stream, such as a river, and out of natural depressions, such as for example a lake, further highlighting that such deposits may have a great capacity.

The transfer of water from the lower main deposit 1 to the upper main deposit 2 is carried out through a main pump 4, while the transfer of water from the upper main deposit 2 to the lower main deposit 1 is carried out by gravity, in this case the water passing through a turbine 5 through which energy is generated. The main pump 4 and the turbine 5 will be connected to the lower main deposit 1 through independent piping that will be joined to the intermediate pipe 3.

In another embodiment, the communication between the main deposits 1-2 is carried out through an intermediate pipe 3, wherein is sandwiched a reversible turbine that will alternately perform the functions of pumping when going up or turbine when going down.

In particular, the main pump 4 and the turbine 5 are incorporated into a reversible hydroelectric plant 10, such that when the water circulates through the intermediate pipe 3 in one direction the water is pumped, while when it circulates in the opposite direction the water is turbined generating energy.

In one of the ends of the bottom of the main deposits 1-2 an area of greater depth will be built which will act as suction vessel 6, allowing the priming of turbines and pumps. It is in these areas of greater depth where the ends of the intermediate pipe 3 are connected. In turn, these areas of greater depth are surrounded by a small curb 7 which will favor the retention of the decanted sludge at the bottom of the deposits in the alternative emptying processes of the same.

Likewise, in the main deposits 1-2 aspiration 8 and purge 8' devices are installed for extracting the sludge, acting mainly in those areas of the bottom of the main deposits 1-2 where the pollutants accumulate in higher concentration by precipitation and decanting. These suction devices 8 are mobile.

The suction devices 8 and the purge devices 8' for sludge extraction, have the corresponding suction 22 and purge 22' pumps and flow into a cavity 9, where part of the water is discharged along with the concentration of the precipitated and decanted pollutants at the bottom of the main deposits 1-2.

This cavity 9 comprises a ring structure by way of perimeter channeling that borders all the nozzle of each one of the main deposits 1-2. This low volume of water with concentration of pollutants contained in said cavity 9 is treated conventionally.

The water treated in the cavity 9 once the pollutants have been separated by overflow or filtering can be recirculated, partially or in its entirety, through recirculation pipes 13 to the main deposits 1-2.

Optionally, the water flow rate treated in the aforementioned cavity 9 can be bypassed, through a drainage pipe 14, to an additional wastewater treatment station 15 that performs a natural and/or artificial purification through various conventional purification systems. The water flow rate from the cavity 9 and that has traveled through the additional wastewater treatment station 15, can be transferred at the end directly to a water stream 17, such as a river, canal, etc.; through a terminal pipe 16, since that water flow rate has a degree of purity according to current regulations.

In an embodiment of the invention, if necessary, before pouring the polluted water into the main deposits 1-2, it is poured first into an initial deposit 11, where the water receives a known prior treatment for treating the acidity and removing the suspended solids. Once said pre-treatment has been carried out, the water is transferred to one of the main deposits by means of an initial pipe 12.

The bottom of this initial deposit also has a suction device 8 and other purge device 8', for the extraction of sludge, both devices 8-8' having in turn the corresponding suction 22 and purge 22' pumps and are connected to the cavity 9 leading to the same.

The bottom of the main deposits 1-2, as well as the cavities 9 comprise a waterproof surface made of polyethylene and other materials, such as for example polyurethanes or asphalt. While at the same time said materials should enable all the deposits to be watertight in order to prevent leakage to the location environment.

The perimeter channeling which constitutes the cavity 9, comprises two similar circuits that converge at a common cabin 20, each of such circuits having at least one overflow dam 18 and one terminal filter 19 allowing to separate the pollutants by decanting and filtering, the overflow dam 18 including emptying valves 21 arranged at different heights.

In an embodiment, the terminal filter 19 is made of gravel.

The system of the invention provides a further treatment through a filtration device 23 placed at the suitable height in a bypass 24 that starts from the intermediate pipe 3 and integrates an opening and closing valve 25.

In another option an additional treatment through a filtration device 23 placed at the suitable height in an additional pipe 27 independent of the intermediate pipe 3 is provided, so that such additional pipe 27 communicates with at least the upper main deposit 2.

Figure 8:
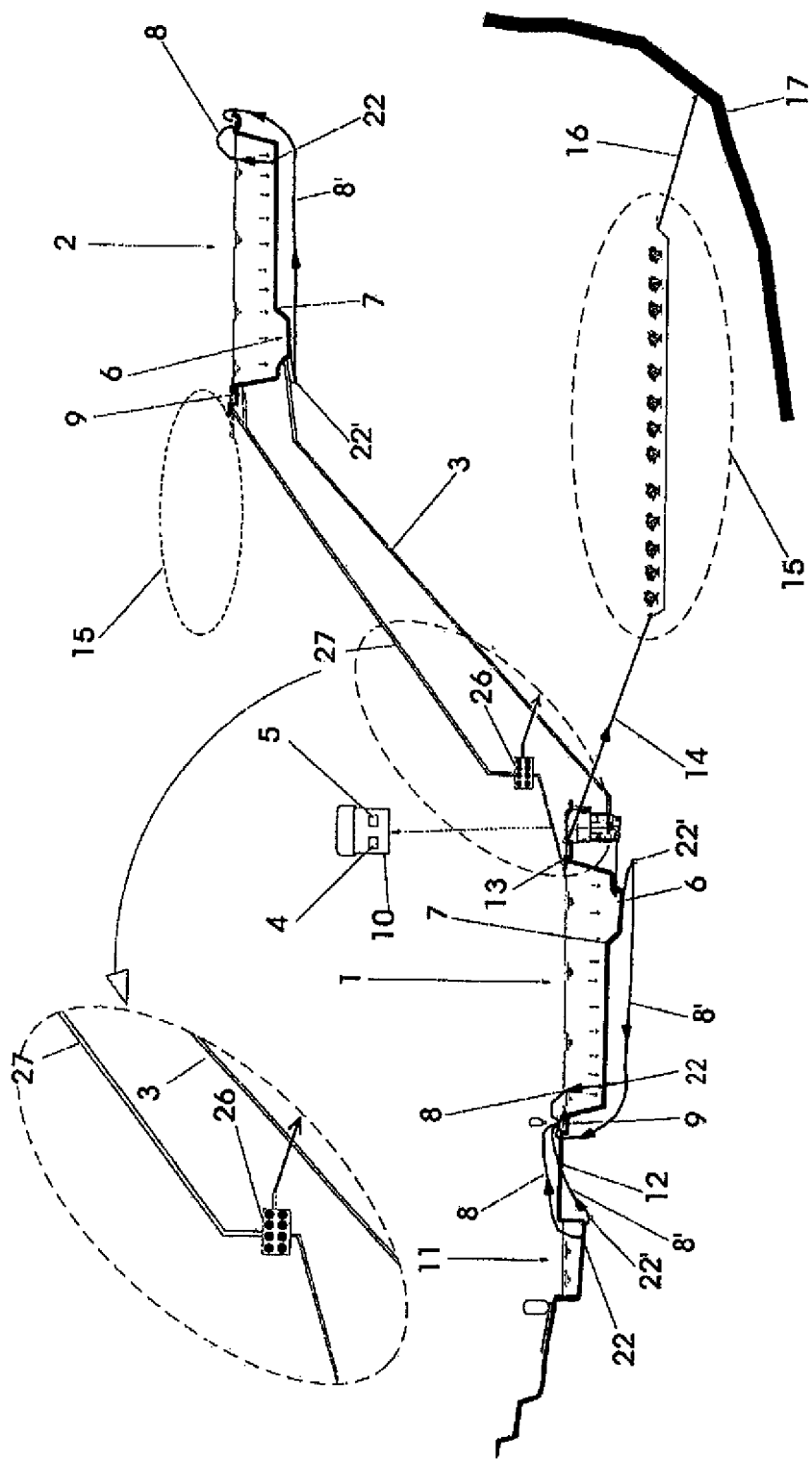
FIG. 8.—It shows the reverse osmosis device placed at the necessary height in the additional pipe independent of the intermediate pipe of interconnection between the main deposits.
Figure 9:
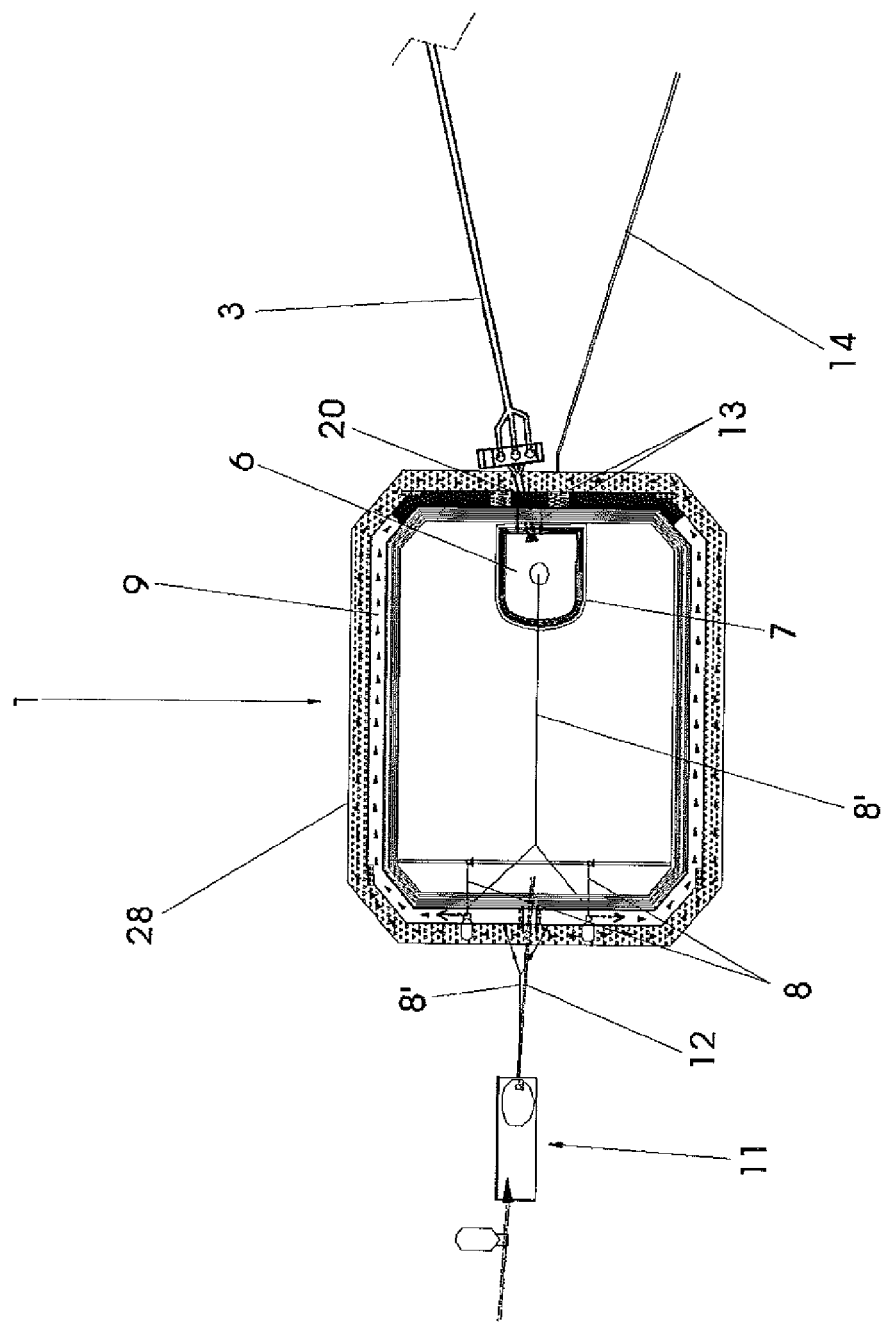
FIG. 9.—It shows a plant view wherein a second cavity or perimeter channeling around the nozzle of the main deposits is highlighted.

In another embodiment, the system of the invention provides an additional treatment through a reverse osmosis device 26 placed at the suitable height on the additional pipe 27 independent of the intermediate pipe 3 (FIG. 8). As another option, the reverse osmosis device 26 is placed on the bypass 24 that starts from the intermediate pipe 3.

In another option, an additional treatment is envisaged wherein the water contained in the main deposits 1 and 2, once most of the pollutants have been precipitated and led to a second cavity or perimeter channeling (28) where they are subjected to additional purification methods such as treatments of lagooning, nitrification/de-nitrification, sulfate-reducing bacteria cultures, or biological removal of phosphorus.

Figure 10:
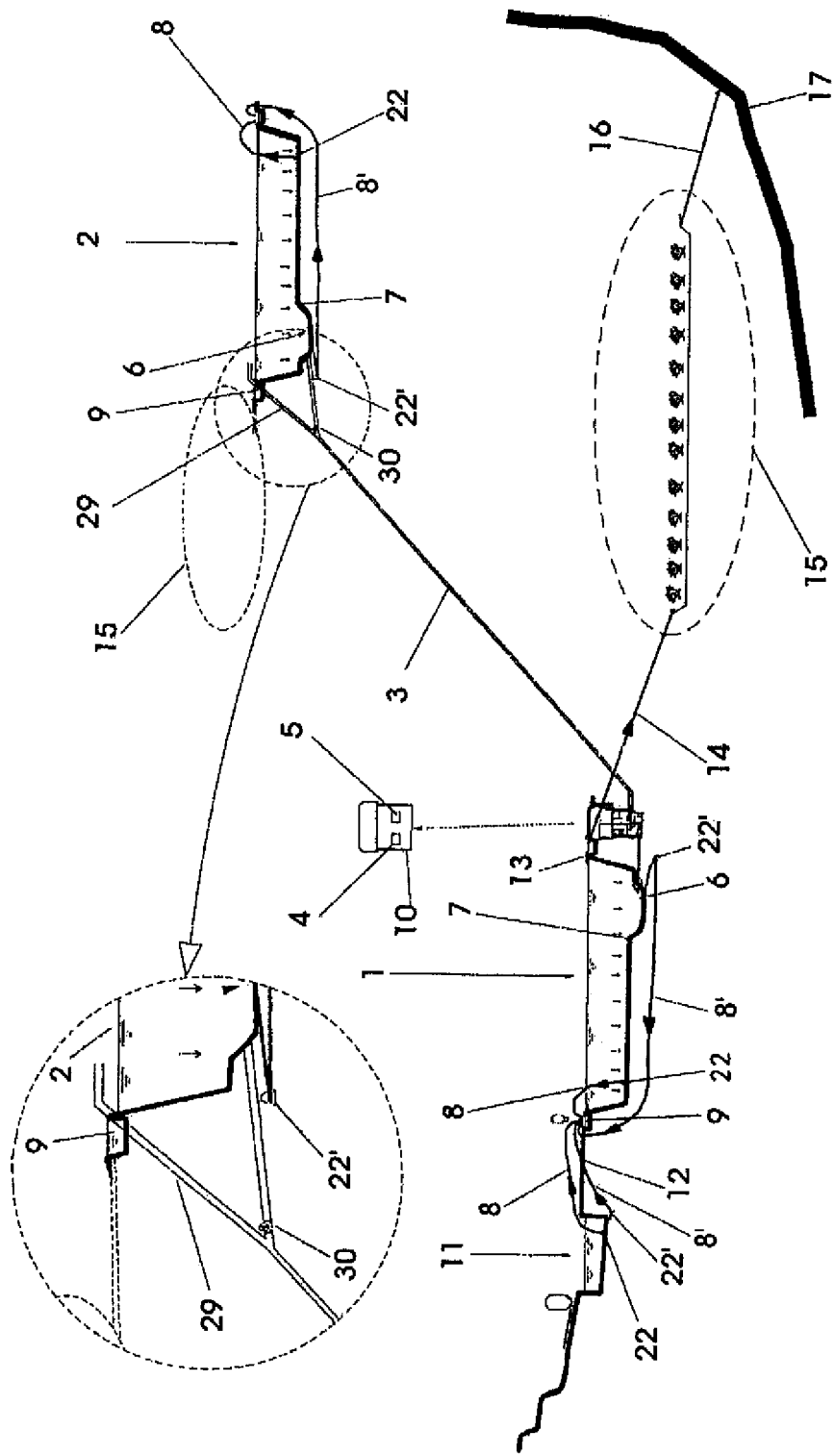
FIG. 10.—It shows an elevational view of the system for purifying polluted water and purification method, with the variant that the water pumped reaches the upper deposit through an upper pipe that allows it to fall freely by the top of said deposit.

Other aspects of the invention are the following:

In another embodiment the pumped water reaches the upper main deposit 2 through an upper bypass 29 that allows the pumped water to fall freely into the aforementioned upper deposit 2 (FIG. 10).

This upper bypass 29 is a bypass that starts from the intermediate pipe 3 in proximity to the upper deposit 2. In an embodiment of the invention, the upper bypass 29 can substitute and function as a surge tank. In the interconnection of the upper bypass 29 with the intermediate pipe 3 is integrated an opening and closing valve 30.

Figure 11:
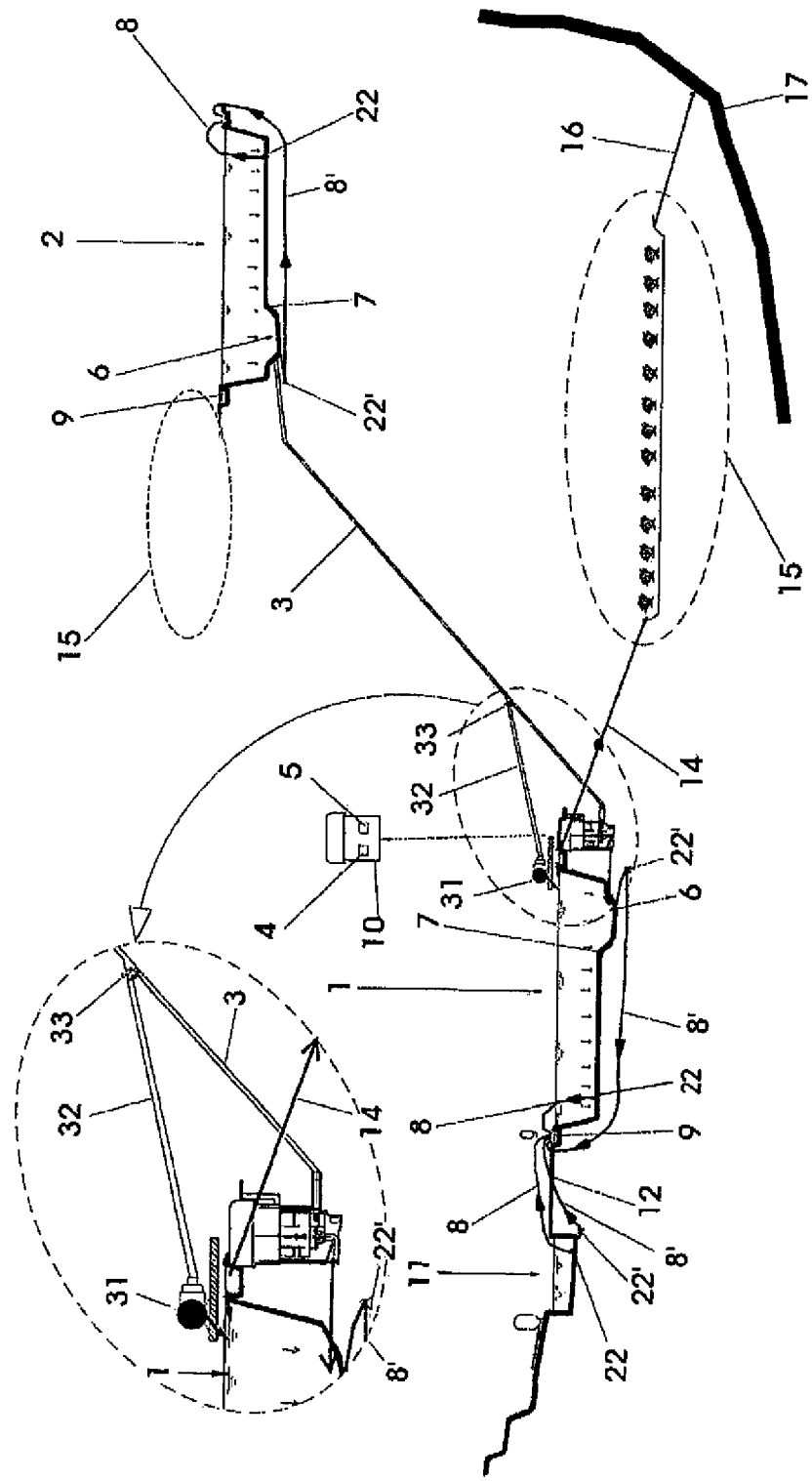
FIG. 11.—It shows an elevational view of the system for purifying polluted water and purification method, with the variant that the transferring of the water between the upper deposit and the lower deposit is carried out through an impulse turbine placed in a lower bypass of the intermediate pipe with no submerged exit in the lower deposit.

In another embodiment of the invention (FIG. 11) the transferring of water between the upper 2 and the lower 1 deposit is carried out through an impulse turbine 31 placed in a lower bypass 32 which starts from the intermediate pipe 3 and has a not submerged exit with drainage in the lower deposit 1, such lower bypass 32 integrating an opening and closing valve 33.

The water flow rate that is decanted through the upper 29 and lower 32 bypass falls freely on the corresponding main deposits 1-2, thus improving the oxygenation and agitation of said water.

The invention claimed is:

1. System for purifying polluted water, which is intended to purify polluted water, both from urban and industrial sources, wherein the system comprises:
   at least one first lower main deposit arranged at a lower level,
   at least one second upper main deposit arranged at an upper level with respect to the first lower main deposit,
   wherein each of said main deposits contains polluted water to be purified and comprising a peripheral edge, and a bottom where pollutants of the polluted water are decanted and precipitated, said bottom comprising:
   a main area,
   vessels whose depth is greater than the corresponding depth of the main area, and an elevated curb that separates the vessels from the main area, and favours the retention of pollutants, at least one intermediate pipe, communicating the vessels of the first lower main deposits with the vessels of the second upper main deposits, through which the polluted water is circulated in both directions successively and alternatively under turbulent regime, at least one cavity intended to receive a mixture formed by water from said main deposits and the pollutants previously decanted and precipitated at the bottom of such main deposits, and intended to treat said pollutants, suction devices and purge devices connecting the main deposits with the cavity, that extract said mixture from the main deposits and direct it towards the cavity, a reversible hydroelectric plant sandwiched in the at least one intermediate pipe comprising:
   a main pump through which the water passes from the lower main deposit to the upper main deposit in a first actuation,
   a turbine through which the water passes and flows by gravity from the upper main deposit to the lower deposit in a second actuation, generating energy.

2. The system for purifying polluted water of claim 1 wherein the at least one cavity comprises a perimeter channelling arranged around the peripheral edge of each one of the main deposits.

3. The system for purifying polluted water of claim 2 wherein said perimeter channelling comprises:
   two similar circuits, each circuit provided with at least one overflow dam and one terminal filter at one of its ends, that separate the pollutants by decanting and filtering obtaining treated water,
   a common receptacle located between the terminal filters of said circuits that receives said treated water.

4. The system for purifying polluted water of claim 3 wherein the overflow dam is fitted with emptying valves arranged at different heights.

5. The system for purifying polluted water of claim 3 wherein the system further comprises:
   a first course provided with recirculation pipes that connect the common receptacle with the main deposits and recirculate the treated water from the common receptacle to the main deposits.

6. The system for purifying polluted water of claim 3 wherein the system further comprises:
   a second course comprising:
      a waste water treatment station
      a drain pipe that connects the common receptacle with the waste water treatment station, conducting the treated water to said water treatment station,
      a terminal pipe connected to the waste water treatment station that drains the water treated in said waste water treatment station.

7. The system for purifying polluted water of claim 3 wherein the system further comprises:
   an initial deposit intended to previously receiving the polluted water, treating the polluted water by adjusting the pH and removing the solids in suspension, before pouring the polluted water to the main deposits, said initial deposit having a bottom where the sludge is accumulated,
   an initial pipe that connects the initial deposit with one of the main deposits through which the polluted water contained in said initial deposit is discharged in the main deposit,
   suction and purge devices connecting said initial deposit and the cavity that extract sludge accumulated on the bottom of the initial deposit and direct it towards the cavity.

8. The system for purifying polluted water of claim 3 wherein the main deposits comprises more than two main deposits connected with each other through intermediate pipes according to a circuit selected from an open and a closed circuit.

9. The system for purifying polluted water of claim 4 wherein the system further comprises:
   second perimeter channeling located in both main deposits annexed to the cavity, which is intended for additional purification processes of the polluted water coming from said cavity.

10. The system for purifying polluted water of claim 3 wherein the system further comprises:
   a filtering element through which at least a part of the flow rate of polluted water is filtered during its transferring between the upper and lower main deposits
   a bypass connection through which the filtering element is connected to the intermediate pipe.

11. The system for purifying polluted water of claim 10 wherein the filtering element is a filtration device.

12. The system for purifying polluted water of claim 10 wherein the filtering element is a device of reverse osmosis.

13. The system for purifying polluted water of claim 3 wherein the system further comprises:
   a filtering element through which at least a part of the flow rate of polluted water is filtered,
   an additional pipe, independent of the intermediate pipe, which connects the filtering element with the upper and lower deposits.

14. The system for purifying polluted water of claim 13 wherein the filtering element is a filtration device.

15. The system for purifying polluted water of claim 13 wherein the filtering element is a device of reverse osmosis.

16. The system for purifying polluted water of claim 3 further comprising:
   an upper bypass channel connected to the intermediate pipe in proximity to the upper deposit which is provided in its free end with a not submerged exit mouth through which it pours the water on the upper deposit,
   opening and closing valves interconnecting the intermediate pipe with the upper bypass channel.

17. The system for purifying polluted water of claim 3 further comprising:
   a lower bypass channel connected to the intermediate pipe in proximity to the lower deposit which is provided in its free end with a not submerged exit mouth through which it pours the water on the lower deposit,
   an impulse turbine integrated in said lower bypass channel,
   opening and closing valves interconnecting the intermediate pipe with the lower bypass channel.

18. Polluted water purification method using the system of claim 1 comprising the following steps:
   transferring polluted water to be purified successively and alternatively, between at least one lower main deposit arranged at a lower level and at least one upper main deposit arranged at an upper level with respect to the lower main deposit, wherein said transferring is performed in both directions: upstream through pumping and downstream by gravity, wherein the polluted water downstream transferred is passed through a turbine causing the rotation of the same, generating power,
   accumulating a concentration of water with pollutants by precipitation and decanting at the bottom of the main deposits,
   extracting water with pollutants from the bottom of the main deposits and diverting them to at least one cavity,
   additional purification process of the water and pollutants in the cavity to separate the pollutants.

19. Polluted water purification method of claim 18 wherein the transferring of the polluted water between the main deposits is carried out through at least one intermediate pipe that connects the bottom of the main deposits.

20. Polluted water purification method of claim 18 wherein previous to the step of transferring the polluted water between the main deposits, the polluted water is treated in an initial deposit where the pH of the water is suited and the solids in suspension and other pollutants are partially removed.

21. Polluted water purification method according to claim 18 further comprising the step of diverting at least part of the water treated in the cavities, from the cavities to an additional purification station.

22. Polluted water purification method according to claim 18 further comprising the step of passing at least part of the water flow rate that is transferred from the upper deposit to the lower deposit, through an impulse turbine.

23. Polluted water purification method according to claim 18 wherein, during the step of transferring polluted water, at least part of the water flow rate is subjected to a filtration process selected from:

microfiltration, ultrafiltration, nanofiltration and reverse osmosis.

\* \* \* \* \*